(12) United States Patent
Moriyama (10) Patent No.: US 9,550,515 B2
(45) Date of Patent: Jan. 24, 2017

(54) STEERING APPARATUS

(75) Inventor: Seiichi Moriyama, Gunma (JP)

(73) Assignee: NSK LTD., Tokyo (JP)

(*) Notice: Subject to any disclaimer, the term of this patent is extended or adjusted under 35 U.S.C. 154(b) by 555 days.

(21) Appl. No.: 13/810,933

(22) PCT Filed: May 25, 2012

(86) PCT No.: PCT/JP2012/063489
§ 371 (c)(1),
(2), (4) Date: Feb. 27, 2013

(87) PCT Pub. No.: WO2012/165333
PCT Pub. Date: Dec. 6, 2012

(65) Prior Publication Data
US 2013/0213173 A1   Aug. 22, 2013

(30) Foreign Application Priority Data

Jun. 3, 2011 (JP) ................................. 2011-125442

(51) Int. Cl.
*B62D 1/19* (2006.01)
*B62D 1/18* (2006.01)
(Continued)

(52) U.S. Cl.
CPC ............... *B62D 1/195* (2013.01); *B60R 25/02* (2013.01); *B62D 1/18* (2013.01); *B62D 1/184* (2013.01); *B62D 1/19* (2013.01); *B62D 1/187* (2013.01)

(58) Field of Classification Search
CPC .......... B62D 1/184; B62D 1/187; B62D 1/195
See application file for complete search history.

(56) References Cited

U.S. PATENT DOCUMENTS 6,237,438 B1 *  5/2001  Ben Rhouma et al. ......... 74/492
2003/0226943 A1 * 12/2003  Laisement et al. ........ 248/230.2
(Continued)

FOREIGN PATENT DOCUMENTS

JP          5-213205        8/1993
JP        2005-280655      10/2005
(Continued)

OTHER PUBLICATIONS

International Search Report dated Aug. 28, 2012, from corresponding International Application No. PCT/JP2012/063489.
(Continued)

*Primary Examiner* — Barry Gooden, Jr.
(74) *Attorney, Agent, or Firm* — Katten Muchin Rosenman LLP (57) ABSTRACT

Construction is achieved wherein performing design for sufficiently maintaining the collapse stroke is simple regardless of whether or not there is a key lock cylinder, and support rigidity of the steering column 1a during normal operation can be adequately increased. A vehicle-side bracket 5a is provided with a stationary-side support plate section 17 on only one side in the width direction of the column-side bracket 4a. This column-side bracket 4a is supported by the stationary-side support plate section 17 so as to be able to displace in the forward direction due to an impact load during a secondary collision. The column-side bracket 4a is also supported by the vehicle-side bracket 5a by way of an installation plate section 21 that is provided in a portion on the opposite side in the width direction of the steering column 1a from the stationary-side support plate section 17 so as to be able to displace in the forward direction due to an impact load during a secondary collision. A key lock cylinder is provided on rear section of the (Continued)

steering column 1a on the opposite side from the stationary-side support plate section 17.

6 Claims, 8 Drawing Sheets

(51) Int. Cl.
  *B62D 1/184* (2006.01)
  *B60R 25/02* (2013.01)
  *B62D 1/187* (2006.01)

(56) References Cited

U.S. PATENT DOCUMENTS

| | | |
|---|---|---|
| 2004/0057786 A1* | 3/2004 | Heiml .......................... 403/373 |
| 2005/0050978 A1 | 3/2005 | Lee |
| 2005/0052014 A1* | 3/2005 | Lee .............................. 280/777 |
| 2007/0145731 A1* | 6/2007 | Ikeda et al. ................... 280/775 |
| 2008/0079253 A1* | 4/2008 | Sekii et al. ................... 280/775 |
| 2009/0031844 A1* | 2/2009 | Iwakawa et al. ............... 74/493 |
| 2010/0139438 A1* | 6/2010 | Appleyard et al. ............. 74/493 |
| 2010/0170364 A1* | 7/2010 | Bertet et al. .................... 74/495 |
| 2010/0219624 A1* | 9/2010 | Matsuno ....................... 280/779 |
| 2011/0036198 A1 | 2/2011 | Minamigata |
| 2013/0133463 A1* | 5/2013 | Moriyama ....................... 74/493 |
| 2013/0263686 A1* | 10/2013 | Osawa et al. ................... 74/495 |
| 2014/0260759 A1* | 9/2014 | Tinnin ............................ 74/493 |

FOREIGN PATENT DOCUMENTS

| | | |
|---|---|---|
| JP | 2005280655 | 10/2005 |
| JP | 2007-69821 | 3/2007 |
| JP | 2008-100597 | 5/2008 |
| JP | 2010-13010 | 1/2010 |
| JP | 2010013010 | 1/2010 |
| JP | 2010-36677 | 2/2010 |
| JP | 2010-201967 | 9/2010 |

OTHER PUBLICATIONS

Chinese Office Action dated May 4, 2014, from the corresponding Chinese Application No. 201210180349.9.

\* cited by examiner

STEERING APPARATUS

TECHNICAL FIELD

The present invention relates to a steering apparatus, and more particularly to a shock absorbing steering apparatus comprising construction that allows the steering wheel to displace in the forward direction during a collision accident.

BACKGROUND ART

Figure 8:
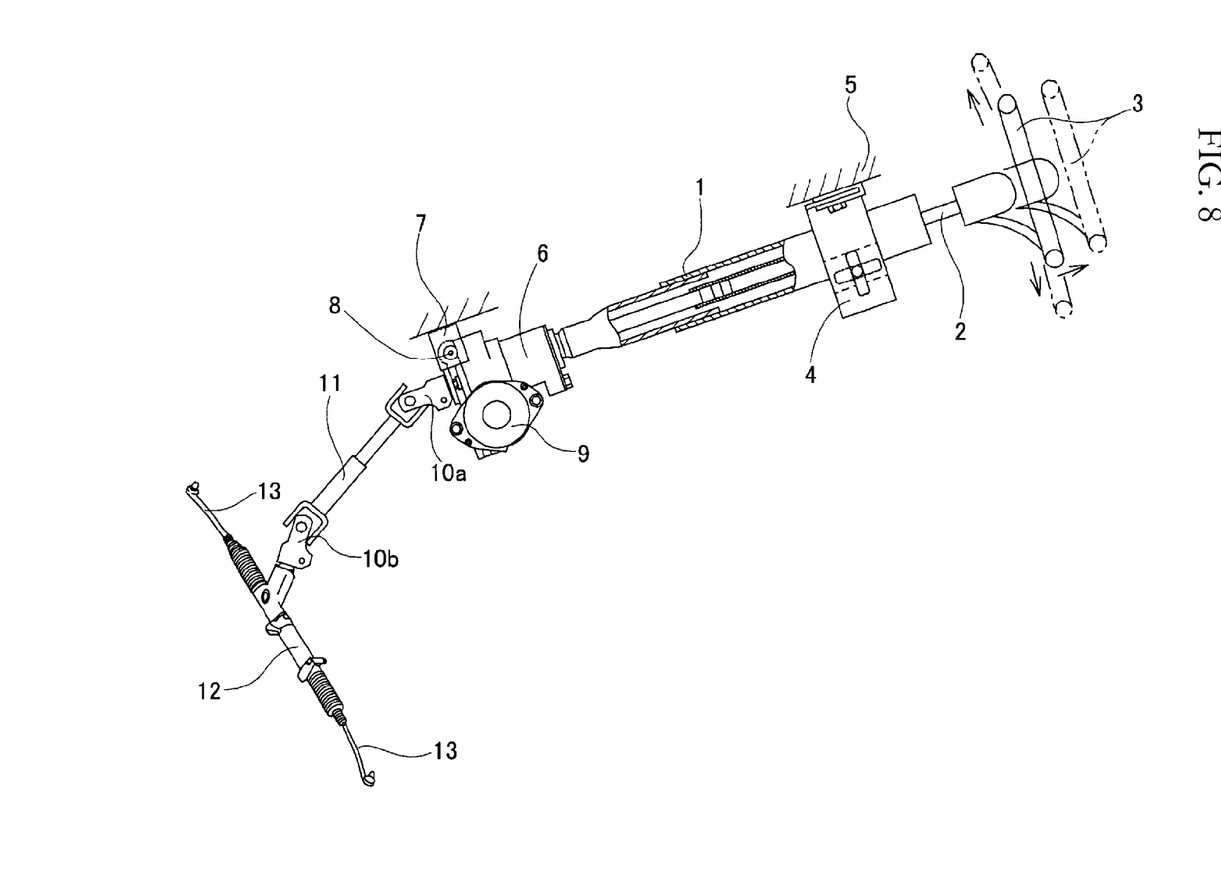
FIG. 8 is a side view with a partial cross-sectional view of an example of a conventional steering apparatus for an automobile.

A steering apparatus is an apparatus for applying a steering angle to the front wheels of an automobile based on operation of a steering wheel. FIG. 8 illustrates an example of a conventional steering apparatus that is disclosed in JP2010-36677(A). In this steering apparatus, a steering shaft 2 is supported on the inside of a steering column 1 so as to be able to rotate freely, and a steering wheel 3 is fastened to the rear end section of the steering shaft 2. The steering column 1, by way of a column-side bracket 4, is supported by a vehicle-side bracket 5 that is fastened to the vehicle body. In this example, in order to be able to adjust the up-down position and the forward-backward position of the steering wheel 3, the steering column 1 and steering shaft 2 are constructed so as to be able to expand and contract, and a housing 6 for an electric power-steering apparatus that is connected and fastened to the front end section of the steering column 1 is supported by a lower bracket 7 that is fastened to the vehicle body so as to be able to pivot around a horizontal shaft 8. The middle section of the steering column 1 is supported by the column-side bracket 4 such that the up-down position and forward-backward position can be adjusted.

An electric motor that is the auxiliary power source for an electric power-steering apparatus is supported by the housing 6. This electric power-steering apparatus outputs torque after adding an auxiliary torque that corresponds to the direction and size of torque inputted from the steering shaft 2 from an electric motor 9. This output torque is transmitted to the input shaft of a steering gear unit 12 by way of a universal joint 10a, an intermediate shaft 11, and another universal joint 10b, and pushes or pulls a pair of left and right tie rods 13. As these tie rods 13 are pushed or pulled, knuckles that support the front wheels pivotally displace and apply a steering angle to the front wheels.

When an automobile that is equipped with this kind of steering apparatus is involved in a collision accident, following a primary collision of the automobile colliding into another automobile or the like, a secondary collision occurs when the body of the driver collides with the steering wheel 3. In order to lessen the impact that is applied to the body of the driver due to this secondary collision, preferably, during this secondary collision, the steering wheel 3 will displace in the forward direction while absorbing the impact energy that is applied from the body of the driver. In order to accomplish this, various kinds of construction of shock absorbing steering apparatuses, such as disclosed in JP2010-36677(A), JP2010-13010(A) and JP2010-2011967(A), have been proposed and widely implemented. In this kind of shock absorbing steering apparatus, in order to adequately protect the driver during a secondary collision, it is necessary for the collapse stroke, which is the length that the steering wheel 3 can displace in the forward direction during a secondary collision, to be as long as possible.

On the other hand, in order to prevent an automobile from being stolen, a steering lock apparatus is installed that, when the ignition switch has been turned OFF, restricts the steering shaft from turning by causing a key lock pin that is provided on the steering column side to engage with a key lock collar that is provided on the steering shaft side. In order to construct this steering lock apparatus, it is necessary to provide a key lock cylinder on part of the steering column in order to house the key lock pin so as to be able to displace in the radial direction of the steering column. Taking into consideration operability, preferably this key lock cylinder is provided in the portion near the rear end of the steering column.

In this kind of steering apparatus, in consideration of the support rigidity and support strength with respect to the vehicle body, construction is employed wherein stationary-side support plate sections that are located on the sides of the steering column are provided in a vehicle-side bracket that is supported by and fastens to the vehicle body, and a column-side bracket that supports the steering column is supported by these stationary-side support plate sections so as to be able to break away toward the front due to impact in a secondary collision. However, in this kind of construction, when stationary-side support plate sections are provided on both the left and right sides of the steering column, protruding objects such as the key lock cylinder hit the rear-end edge of one of the stationary-side support plate sections during the initial stage of a secondary collision, and hinders the forward displacement of the steering column beyond that point, so in disadvantageous from the aspect of maintaining the collapse stroke.

In JP2010-13010(A), construction is disclosed that is different from the construction described above of providing stationary-side support plate sections, and in this construction a column-side bracket that supports the middle section of the steering column is suspended from and supported by the bottom side of a flat support plate that is fastened to the vehicle body side so as to be able to displace in the forward direction due to impact during a secondary collision. In the case of this kind of construction, displacement in the forward direction of objects that are provided on the steering column and that protrude to the side such as the key lock cylinder, casing for a combination switch and the like is not prevented by a portion that is fastened to the vehicle body such as a vehicle-side bracket, which is advantageous from the aspect of maintaining the collapse stroke. However, this construction is disadvantageous from the aspect of improving support rigidity of the steering column with respect to the vehicle body.

Moreover, JP2010-201967(A) discloses construction wherein a stationary-side support plate section of the vehicle-side bracket is provided on only one side of the steering column. With this kind of construction, the collapse stroke is not limited by objects provided on the steering column that protrude to the side hitting the stationary-side support plate section. However, in the case of this kind of construction, the steering column is supported by the vehicle-side bracket on only one side in the width direction. Therefore, even though construction is such that a stationary-side support plate section is provided in the vehicle-side bracket, the support rigidity of the steering column is cannot always be made high enough.

JP2005-280655(A) discloses an example of construction for absorbing an impact load during a secondary collision. In this construction, during a secondary collision, by having a sliding shaft displace in the forward direction while pushing and expanding the width of a long hole that is formed in a support member in the forward-backward direction of the vehicle, impact load due to the secondary collision is absorbed. Moreover, there are restricting sections on both sides in the width direction of the support member that prevent the support member from expanding in the width direction, in order that the impact load can be absorbed stably. Furthermore, JP2007-69821(A) and JP2008-100597 (A) disclose a steering apparatus in which a friction member having multi-plate construction is located between the vehicle-side bracket and column-side bracket in order to increase the surface area of friction between the surfaces of these brackets that undergo relative displacement during a secondary collision, and increase the holding force for keeping the steering wheel in the adjusted position.

All of the related technical literature described above is incorporated into this specification by reference.

RELATED LITERATURE

Patent Literature

[Patent Literature 1] JP2010-36677(A)
[Patent Literature 2] JP2010-13010(A)
[Patent Literature 3] JP2010-201967(A)
[Patent Literature 4] JP2005-280655(A)
[Patent Literature 5] JP2007-69821(A)
[Patent Literature 6] JP2008-100597(A)

SUMMARY OF THE INVENTION

Problem to be Solved by the Invention

In consideration of the situation described above, the object of the present invention is to provide construction of a steering apparatus that, regardless of whether there is a key lock cylinder, makes it easier to perform design for adequately maintaining the collapse stroke of the steering column, and sufficiently increasing support rigidity of the steering column during normal operation.

Means for Solving the Problems

The steering apparatus of the present invention has;
a steering column that supports a steering shaft on the inside thereof such that the steering shaft can rotate freely;
a column-side bracket that supports part of the steering column; and
a vehicle-side bracket that is supported by and fastened to the vehicle body, and has a stationary-side support plate section that is provided only on one side in the width direction of the column-side bracket.

In the steering apparatus of the present invention, a portion of the column-side bracket is supported by the stationary-side support plate section so as to be able to displace in the forward direction due to an impact load during a secondary collision, and a portion of the column-side bracket that is on the opposite side in the width direction of the column-side bracket of the steering column from the stationary-side support plate section is supported by the vehicle-side bracket so as to be able to displace in the forward direction due to an impact load during a secondary collision.

More specifically, the column-side bracket has a pair of movable-side support plate sections that are located on the left and right, a connecting plate section that connects the edges on the bottom ends of these movable-side support plate sections, and an installation plate section that is bent outward in the width direction from the edge on the top end of one of the movable-side support plate sections. The other movable-side support plate section forms the portion of the column-side bracket that is supported by the stationary-side support plate section, and the installation plate section forms the portion of the column-side bracket that is on the opposite side of the steering column from the stationary-side support plate section and that is supported by the vehicle-side bracket.

In the case where the steering apparatus of the present invention is provided with a steering lock apparatus, a key lock cylinder of the steering lock apparatus is provided on the steering column in a state protruding from the outer circumferential surface of the steering column in a portion that, before a secondary collision occurs, is in a location that is further toward the rear in the forward-backward direction of the steering column than the vehicle-side bracket, is on the opposite side in the width direction of the steering column from the stationary-side support plate section, and does not interfere with the portion of the column-side bracket that is on the opposite side of the steering column from the stationary-side support plate section and that is supported by the vehicle-side bracket.

In the steering apparatus of the present invention, the following construction is used for supporting the column-side bracket by the vehicle-side bracket. In other words, the column-side bracket has a movable-side support plate section that forms the portion of the column-side bracket that is supported by the stationary-side support plate section (in the case of comprising a pair of movable-side support plate sections, the other movable-side support plate section that is located on the stationary-side support plate section side), a first long hole that is long in the forward-backward direction is formed in the bottom section of this movable-side support plate section, and a first connecting member is assembled in the bottom section of the stationary-side support plate section. On the other hand, a second long hole that is long in the forward-backward direction is formed in the bottom section of the stationary-side support plate section in the portion that is further toward the rear than the position where the first connecting member is assembled, and a second connecting member is assembled in the rear-end section of the bottom section of the movable-side support plate section. With the stationary-side support plate section and the movable-side support plate section placed together, the first connecting member is inserted through the first long hole and connected to the movable-side support plate section, and the second connecting member is inserted through the second long hole and connected to the stationary-side support plate section.

When a telescopic mechanism is assembled in the steering apparatus of the present invention, the column-side bracket has a pair of movable-side support plate sections that are located on the left and right, and the steering column has a telescopic steering column that is constructed by fitting together the rear section of an inner column on the front side and the front section of an outer column on the rear side, such that the entire length can expand or contract, and a long hole that is long in the forward-backward direction is provided in the top section of the outer column. Moreover, the steering apparatus has a rod member that spans between the movable-side support plate sections and engages with the long hole in the forward-backward direction, an adjustment lever that is connected to one end of the rod member, and an adjustment mechanism that, based on the operation of the adjustment lever, changes the holding force by which the column-side bracket holds the outer column. Moreover, whether or not displacement in the forward direction of the outer column with respect to the column-side bracket is possible is changed based on the operation of the adjustment lever. In this case, the telescopic mechanism uses a steering shaft that is a telescopic steering shaft constructed by combining an outer shaft and an inner shaft, and that can transmit torque and expand and contract.

Moreover, when a tilt mechanism is assembled in the steering apparatus of the present invention, the column-side bracket has a pair of movable-side support plate sections that are located on the left and right, each provided with a long hole that is long in the up-down direction, and a through hole is formed in the top section of the steering column. The steering apparatus has a rod member that spans between the movable-side support plate sections and engages with the long hole in the forward-backward direction and the through hole of the steering column, an adjustment lever that is connected to one end of the rod member, and an adjustment mechanism that, based on the operation of the adjustment lever, changes the holding force by which the column-side bracket holds the outer column. The steering column is supported by the vehicle body so as to be able to raise or lower with respect to the column-side bracket, and whether or not displacement of the steering column in the up-down direction with respect to the column-side bracket is possible is changed based on the operation of the adjustment lever.

In construction wherein a telescopic mechanism and/or tilt mechanism is assembled, the adjustment mechanism for changing the force by which the column-side bracket holds the steering column has a member having a pair of pressing surfaces that are provided on the base end section and tip end section of the rod member, and the force that these pressing surfaces hold the steering column from both sides in the width direction changes based on the rotation of the rod member according to operation of the adjustment lever. In this case, preferably, of the movable-side support plate sections, a slit is formed in one movable-side support plate section that is on the opposite side from the stationary-side support plate section, and rigidity in the axial direction of the rod member of a portion of the one movable-side support plate section that is pressed by one of the pressing surfaces is kept low.

Effect of the Invention

With the steering apparatus of the present invention, construction is such that the support rigidity of the steering column during normal operation is sufficiently high, and the design for adequately maintaining the collapse stroke of the steering column can be performed simply.

In other words, in the steering apparatus of the present invention, the steering column is constructed so as to be supported by the side surface of a stationary-side support plate section, and the vehicle-side bracket in which this stationary-side support plate section is provided is supported by and fastened to the vehicle body, and has high rigidity in all directions. Particularly, in the apparatus of this invention, the rigidity in the width direction can be greater than in construction wherein the column bracket is suspended below a support plate. Furthermore, in the apparatus of the present invention, the column-side bracket is also supported by the vehicle-side bracket in a portion on the opposite side of the steering column from the stationary-side support plate section.

The stationary-side support plate section is provided on only one side in the width direction of the steering column, so by providing an object such as a key lock cylinder or combination switch casing that protrudes to the side on the opposite side in the width direction from the stationary-side support plate section, this object that protrudes to the side does not interfere with the portion fastened to the vehicle body during a secondary collision, so it is possible to maintain the collapse stroke regardless of whether there is this object that protrude to the side.

MODES FOR CARRYING OUT THE INVENTION

FIG. 1 to FIG. 7 illustrate an example of an embodiment of the present invention. The steering apparatus of this example comprises: a steering column 1 that supports a steering shaft 2a on the inside thereof so that the steering shaft 2a can rotate freely; a column-side bracket 4a that supports part of the steering column 1; and a vehicle-side bracket 5a that is supported by and fastened to the vehicle body, and comprises a stationary-side support plate section 17 that is provided on only one side in the width direction of the column-side bracket 4a. Moreover, in the steering apparatus of this example there is a telescopic mechanism for adjusting the forward-backward position of a steering wheel 3 that is fastened to the rear-end section of the steering shaft 2a that protrudes from an opening on the rear end of the steering column 1a, and a tilt mechanism for adjusting the up-down position of the steering wheel 3. In order to construct the telescopic mechanism, the steering column 1a is constructed so that it can expand or contract along the entire length by fitting together the front section of an outer column 14 that is located on the rear side and the rear section of an inner column 15 that is located on the front side (telescopic steering column). Furthermore, the column-side bracket 4a is supported by the vehicle-side bracket 5a so as to be able to break away in the forward direction due to an impact load during a secondary collision.

The vehicle-side bracket 5a is integrally formed by casting, particularly, die casting, a ferrous alloy or aluminum alloy, and comprises a stationary-side installation plate section 16 that is provided on the top end section, and a single stationary-side support plate section 17 that hangs down from a portion on the bottom surface of the stationary-side installation plate section 16 that is further on one side than the center section in the width direction. This stationary-side support plate section 17 is such that the bottom end section is wider than the middle section to the portion near the top, and protrudes toward the front by the amount of that this bottom end section is wider. This kind of vehicle-side bracket 5a is supported by and fastened to the vehicle body by bolts or studs that are inserted through a pair of through holes 18 that are formed in both end sections of the stationary-side installation plate section 16. Therefore, the vehicle-side bracket 5a does not displace in the forward direction even during a secondary collision.

On the other hand, the column-side bracket 4a is formed by bending a ferrous alloy plate such as carbon steel plate or stainless steel plate, or some other metal plate. This column-side bracket 4a comprises: a pair of movable-side support plate sections 19a, 19b that are located on the left and right; a connecting plate section 20 that connects the bottom-end edges of these movable-side support plate sections 19a, 19b; and an installation plate section 21 that is bent outward in the width direction from the top-end edge of one support plate section 19b (right support plate section in FIG. 4). This kind of column-side bracket 4a is supported by the vehicle-side bracket 5a at two locations on both end sections in the width direction so as to be able to break away in the forward direction during a secondary collision.

The other moveable-side support plate section 19a (left support plate section in FIG. 4) is supported by the stationary-side support plate section 17 by a first long hole 22 and a second long hole 23 that are each long in the forward-backward direction fitting with a first connecting member 24 and second connecting member 25. The first long hole 22 is provided at the bottom section of the movable-side support plate section 19a in the forward-backward direction, and the first connecting member 24 that is attached to the front-end section of the bottom section of the stationary-side support plate section 17 is inserted through this first long hole 22. On the other hand, the second long hole 23 is provided in the forward-backward direction in the portion on the bottom section of the stationary-side support plate section 17 that is further on the rear side than the position where the first connecting member 24 is provided, and the second connecting member 25 that is attached to the rear-end section of the bottom section of the movable-side support plate section 19a is inserted through the second long hole 23. The stationary-side support plate section 17 and the movable-side support plate section 19a that are placed one on top of the other are connected by the first connecting member 24 and second connecting member 25 so that stationary-side support plate section 17 and the movable-plate support section 19a are capable of relative displacement in the forward-backward direction during a secondary collision.

It is possible to use bolts, for example, as the first connecting member 24 and second connecting member 25, and to screw the bolts into nuts and tighten to a specified torque. In that case, the stationary-side support plate section 17 and the movable-side support plate section 19a are connected together by two bolts and nuts that are provided on both the front and rear end sections of the area where the stationary-side support plate section 17 and the movable-side support plate section 19a are placed together. Alternatively, a bolt can be inserted through the first long hole 22 from the side of the inside surface of the movable-side support plate section 19a and screwed into a screw hole that is formed on the front-end section of the stationary-side support plate section 17, and further tightened, and a bolt can be inserted through the rear-end section of the second long hole 23 from the outside surface side and screwed into a screw hole that is formed in the rear end section of the movable-side support plate section 19a, and further tightened. In either case, a slid plate 26 that is made of synthetic resin such as polyimide resin, polytetrafluoroethylene resin, and the like that slides easily or that is constructed from a metal plate that is coated with this kind of synthetic resin, is held between the surfaces that undergo relative displacement during a secondary collision, which makes it possible for the movable-side support plate section 19a to smoothly displace in the forward direction with respect to the stationary-side support plate section 17.

One side (the other movable-side support plate section 19a) of the sides in the width direction of the column-side bracket 4a is connected to the stationary-side support plate section 17 as described above, and the other side (the one movable-side support plate section 19b) is supported by the stationary-side installation plate section 16 of the vehicle-side bracket 5a so as to be able to break away in the forward direction due to an impact load during a secondary collision. More specifically, the installation plate section 21 is supported by the stationary-side installation plate section 16 by way of a slide plate 27 and by a bolt 28. This slide plate 27 that is made of synthetic resin such as polyimide resin, polytetrafluoroethylene resin, and the like that slides easily, or that is constructed from a metal plate that is coated with this kind of synthetic resin, and is formed into a U shape having an opening to the front. A notch that is open on the rear is formed in the portion of the installation plate section 21 through which the bolt is inserted. Therefore, in a state where an impact load is applied due to a secondary collision, the installation plate section 21 breaks away in the forward direction from the stationary-side installation plate section 16. Depending on the construction of the vehicle-side bracket 5a or the potion that is fastened to the vehicle body that includes the vehicle-side bracket 5a, it is possible to employ construction wherein there is no installation plate section 21, and for example, one movable-side support plate section 19b further extends upward, and the stationary-side installation plate section 16 of the vehicle-side bracket 5a is also bent upward, and connects the top-end section of the movable-side support plate section 19b to the stationary-side installation plate section 16.

In this way, the column-side bracket 4a, which is supported by the vehicle-side bracket 5a so as to be able to displace in the forward direction due to a secondary collision, supports the outer column 14 so as to be able to displace in the forward-backward direction and the up-down direction. First, in order for displacement in the forward-backward direction to be possible, a pair of held wall sections 29 that is located on the left and right is provided on the upper half of the front end section of the outer column 14 being parallel with each other on both sides of a slit 30 in the center section. The front end section of this slit 30 is open to the center section of a slit 31 in the circumferential direction that is formed on the front-end section of the outer column 14, and the rear end section is open to a stepped section that exists in the center section of the top surface of the outer column 14. Therefore, the inner diameter of the space between the held wall sections 29 and the front-end portion of the outer column 14 can elastically expand or contract. The rear-end section of the inner column 15 fits inside the front end section of the outer column 14 whose inner diameter can expand or contract in this way. Moreover, long holes 32 that are long in the forward-backward direction and that are parallel with the center axis of the outer column 14 are formed in portions of each of the held wall sections 29 that are aligned with each other. Long concave grooves 33 that are long in the axial direction are formed in two locations on both sides in the width direction of the lower portion of the front half of the outer circumferential surface of the outer column 14, and make it easier for the front half of the outer column 14 to expand or contract in the radial direction.

On the other hand, in order to support the outer column 14 by the column-side bracket 4*a* so that displacement is possible in the up-down direction, the front end section of the inner column 15 is supported by a lower bracket 7 that is fastened to the vehicle body such that pivotal displacement is possible around a horizontal shaft 8 (see FIG. 8). Moreover, long holes 34 in the up-down direction, which have a partial arc shape with the horizontal shaft 8 as the center, are formed in portions of the movable-side support plate sections 19*a*, 19*b* of the column-side bracket 4*a* that are aligned with each other.

An adjustment rod 35, which is a rod member, is inserted into these long holes 34 in the up-down direction and long holes 32 in the forward-backward direction. The base end section of an adjustment lever 36 is connected to the base end section of this adjustment rod 35 in the portion that protrudes from the outside surface of the other movable-side support plate section 19*a*, and a pressing piece 37, such as a nut or the like, of an adjustment mechanism fastens to the portion on the tip end section of the adjustment rod 35 that protrudes from the outside surface of the one movable-side support plate section 19*b*. Based on the operation of the adjustment lever 36 of the adjustment mechanism having known arbitrary construction, the force pressing the outside surfaces of the movable-side support plate sections 19*a*, 19*b* is changed, and it is possible to adjust the holding force for holding the outer column 14 by the column-side bracket 4*a*.

The type of adjustment mechanism used does not particularly matter, however, for example, it is possible to employ construction wherein a cam apparatus is placed between the base end section of the adjustment lever 36 and the outside surface of the other movable-side support plate section 19*a* and expands or contracts the dimension in the axial direction based on operation of the adjustment lever 36, and a thrust bearing 40 and pressing plate 41 are placed between the pressure piece 37 and the outside surface of the one movable-side support plate section 19*b*. When using this kind of construction, when adjusting the position of the steering wheel 3, by turning the adjustment lever 36 downward, for example, the dimension in the axial direction of the cam apparatus is reduced, and the force at which the pressing surface of the cam apparatus and the pressing surface of the pressing plate 41 press the outside surfaces of the movable-side support plate sections 19*a*, 19*b* is reduced or eliminated. In this state, it is possible to adjust the forward-backward position or the up-down position of the steering wheel 3 within a range in which the adjustment rod 35 can displace inside the long holes 32 in the forward-backward direction or in the long holes 34 in the up-down direction.

Figure 1:
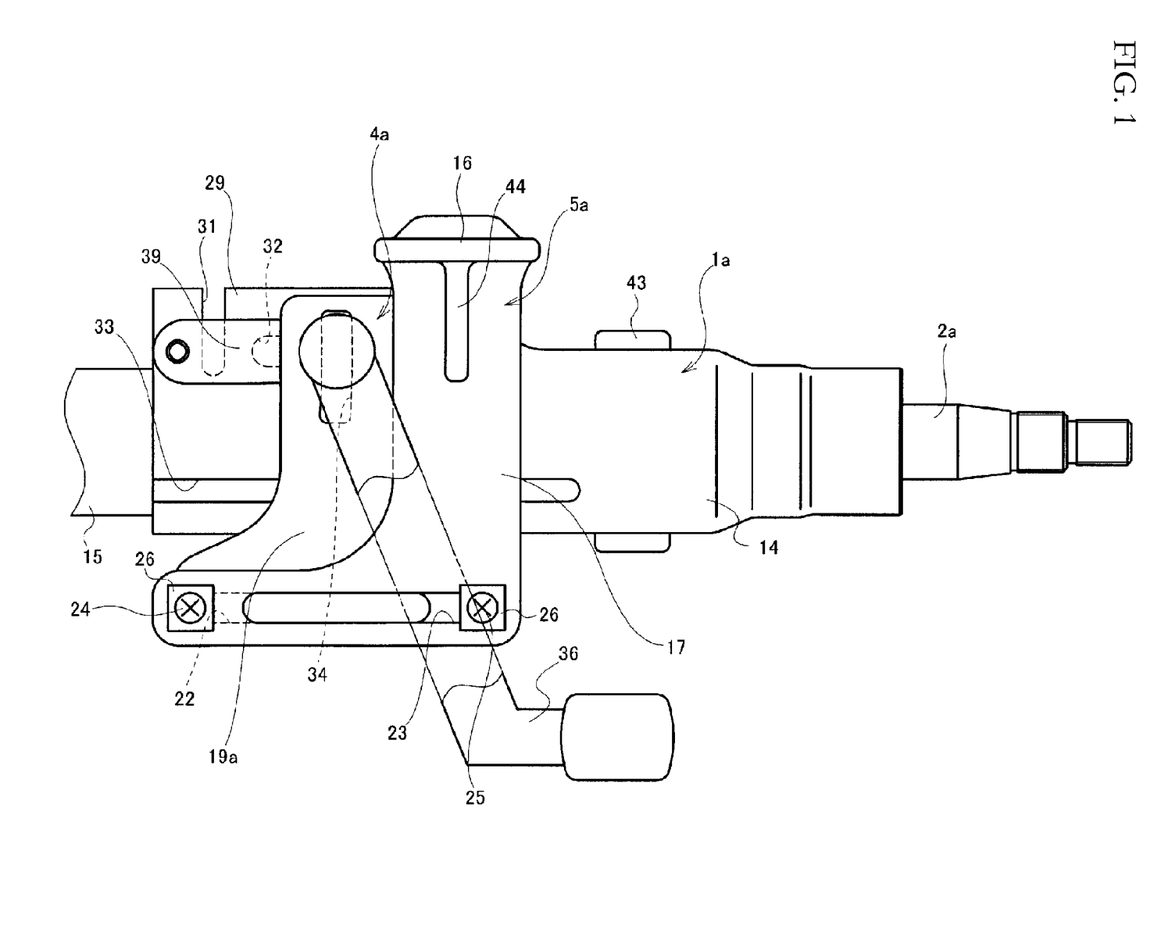
FIG. 1 is a side view of an example of an embodiment of the present invention, and illustrates a state during normal operation when the forward-backward position of the steering wheel is in the most forward position.
Figure 2:
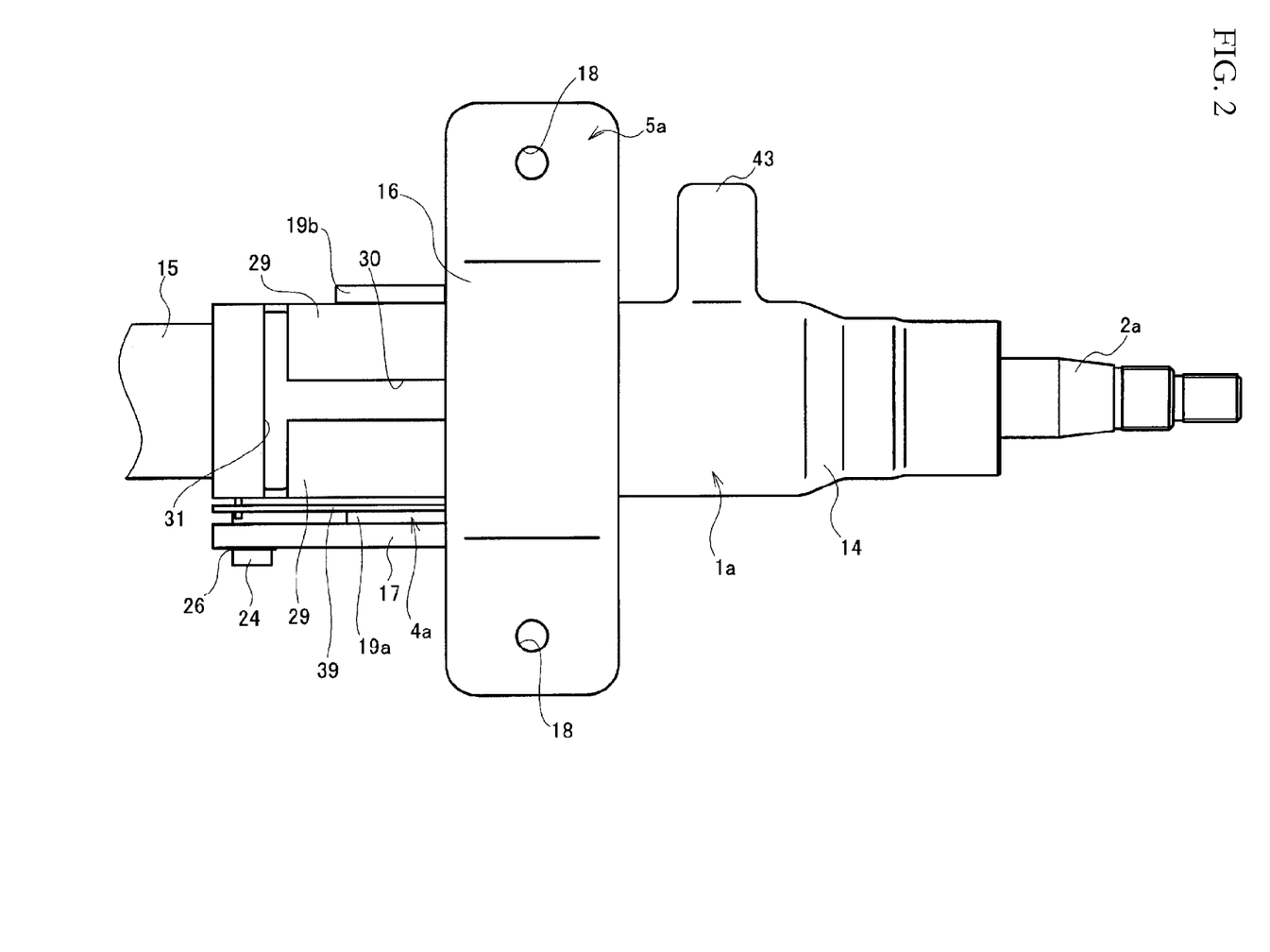
FIG. 2 is a top view with part omitted as seen from above in FIG. 1.
Figure 3:
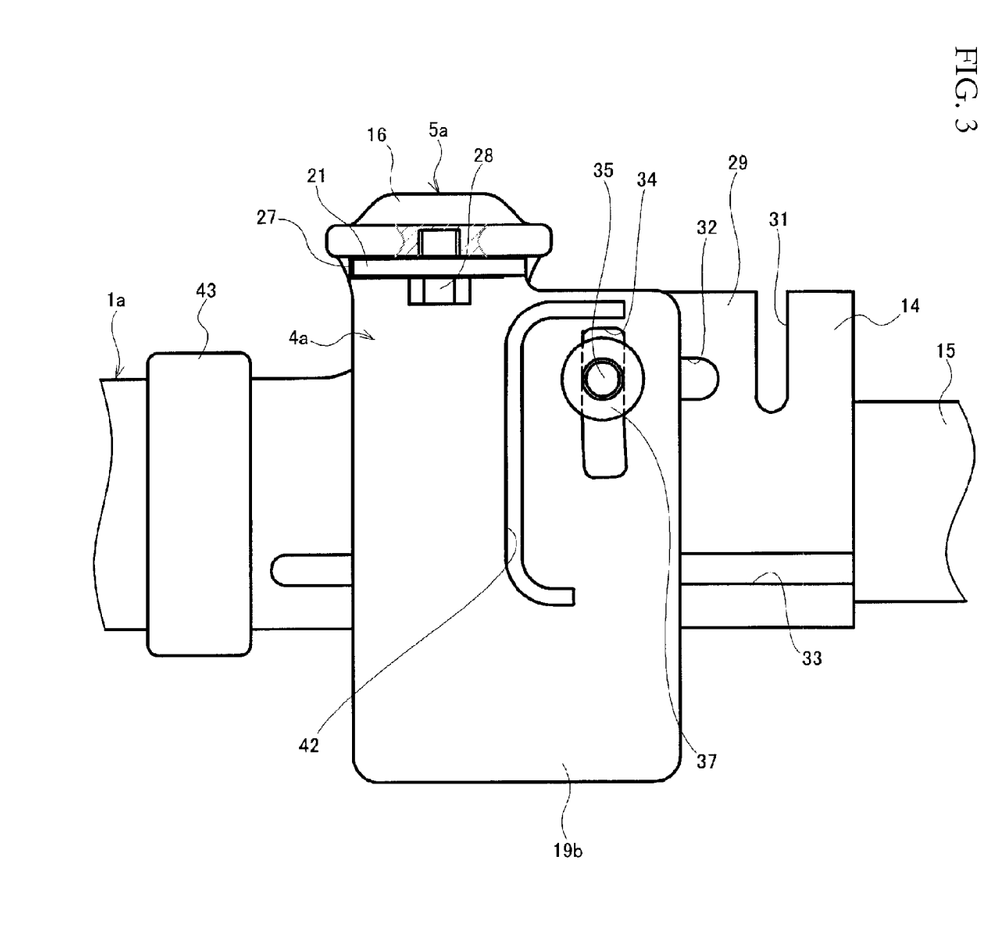
FIG. 3 is a side view of the left half in FIG. 1 as seen from the rear side in FIG. 1.
Figure 4:
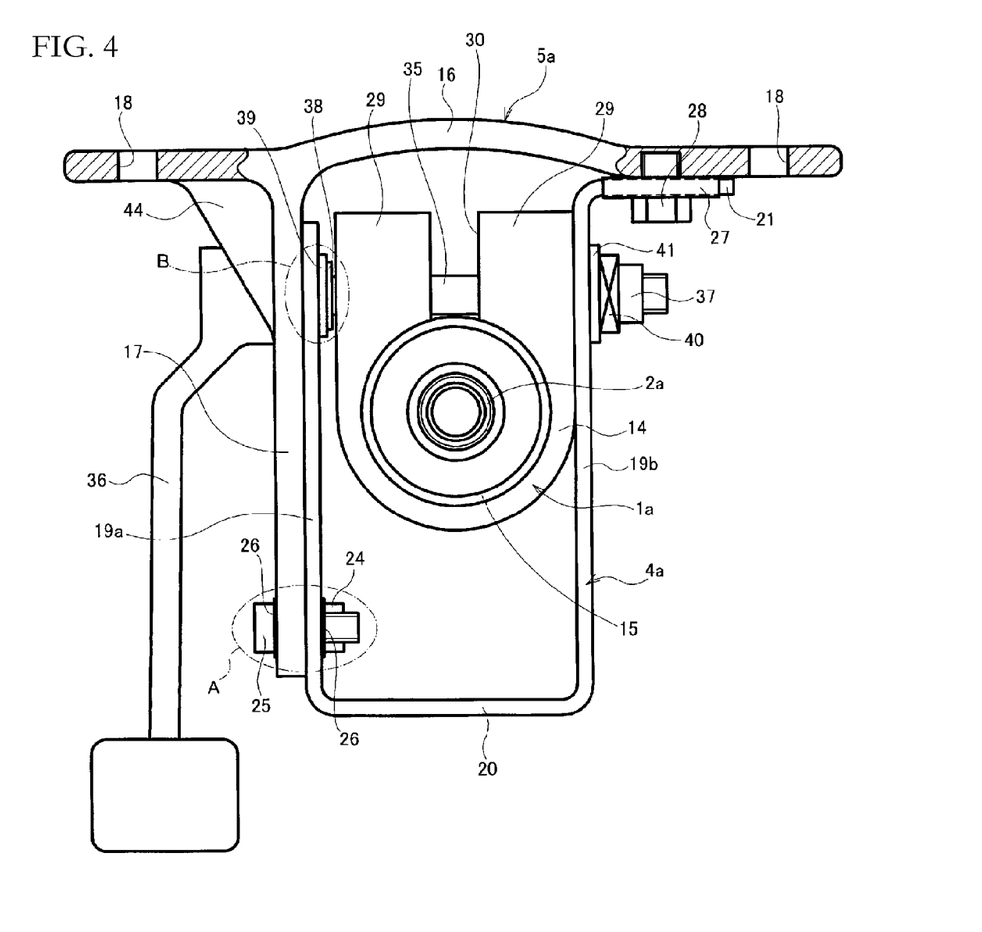
FIG. 4 is an end view with a partial cross-sectional view as seen from the right in FIG. 1.
Figure 5:
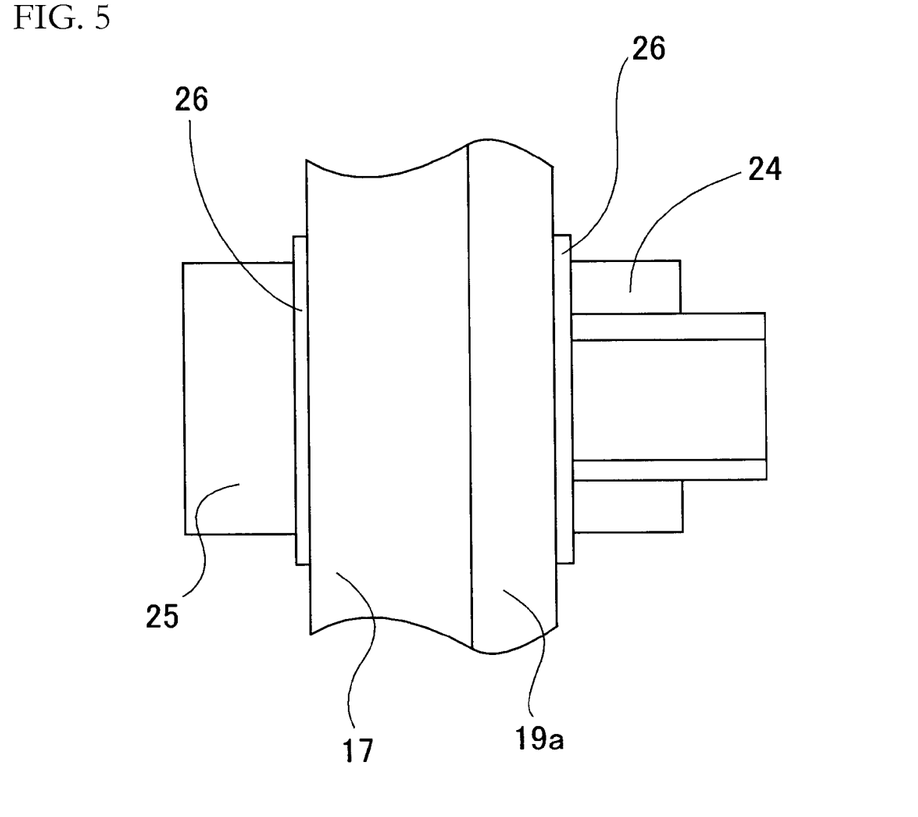
FIG. 5 is an enlarged view of part A in FIG. 4.
Figure 6:
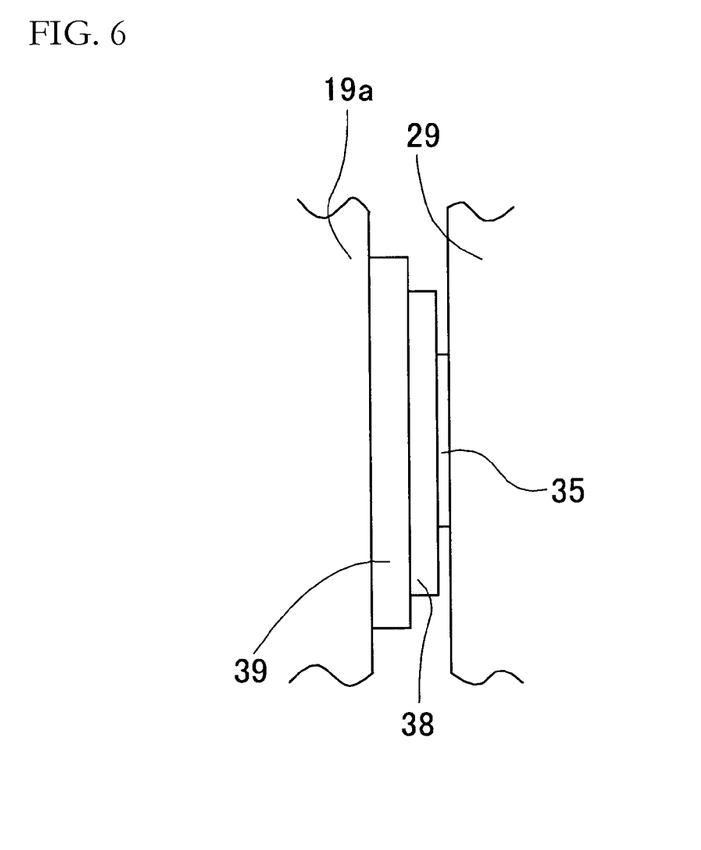
FIG. 6 is an enlarged view of part B in FIG. 4.
Figure 7:
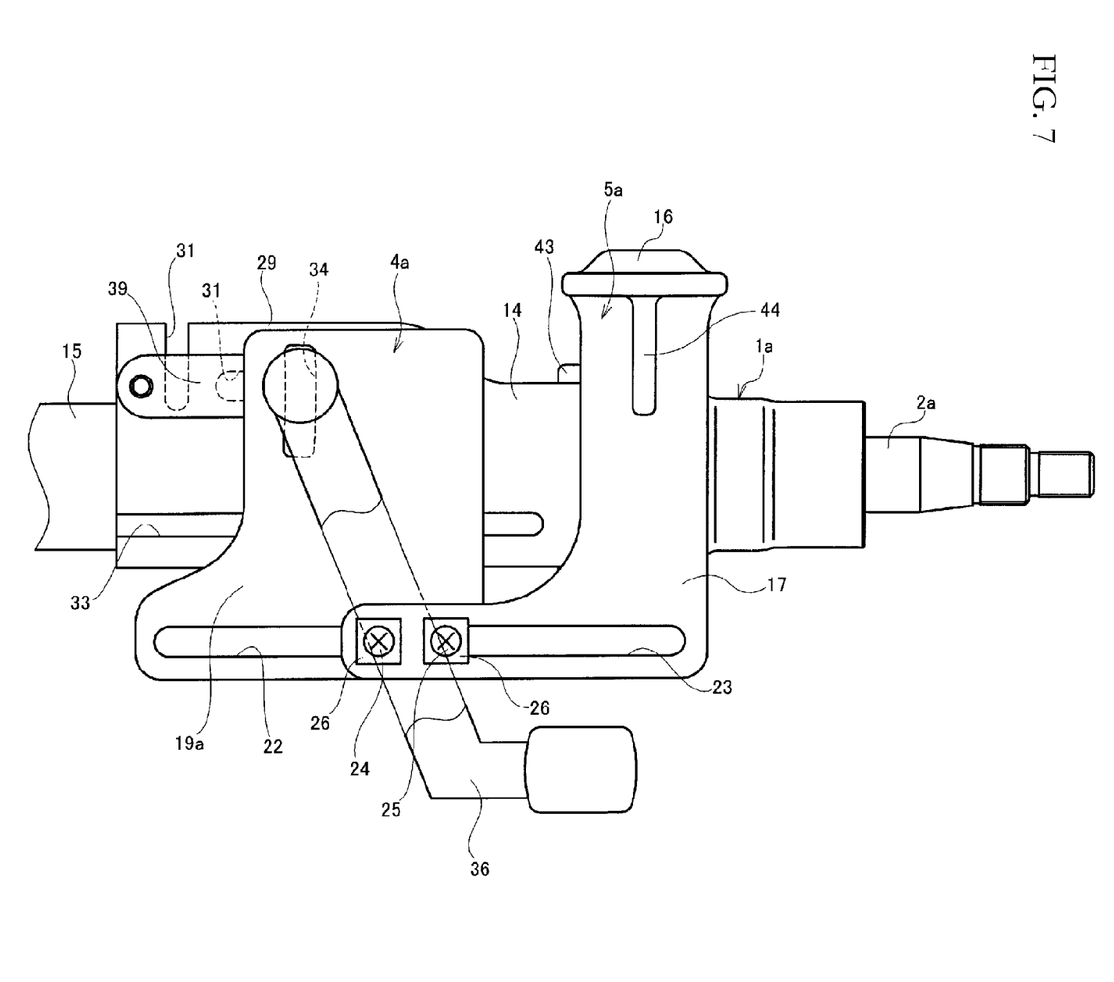
FIG. 7 is a side view of the example shown in FIG. 1 illustrating the state after a secondary collision has advanced.

By rotating the adjustment lever 36 upward with the steering wheel 3 moved to the desired position, the dimension in the axial direction of the cam apparatus is expanded, and the force at which the pressing surface of the cam apparatus and the pressing surface of the pressing plate 41 press the outside surfaces of the movable-side support plate sections 19*a*, 19*b* becomes large. In this state, these movable-side support plate sections 19*a*, 19*b* firmly hold the outer column 14, and the inner diameter of the front-end section of the outer column 14 is contracted. As a result, the up-down position and forward-backward position of the steering wheel 3 are maintained in the adjusted positions. A washer 38 and laminated plate 39 are provided between the inside surface of the other movable-side support plate section 19*a* and the outside surface of the one held wall section 29. This laminated plate 39 is known (refer to JP2007-69821 (A) and JP2008-100597(A)), and with the adjustment lever 36 rotated upward, has the function of increasing the holding force for holding the outer column 14 by the column-side bracket 4*a*. Moreover, a slit 42 as illustrated in FIG. 3 is provided in the portion of part of the one movable-side support plate section 19*b* that surrounds from three sides the portion that is pressed by the pressing surface of the pressing piece 37 (in the case of construction wherein a pressing plate 41 is provided, the pressing plate 41), and the rigidity of this portion in the axial direction of the adjustment rod 35 is kept low. With this construction, the operating force of the adjustment lever 36 can be efficiently converted to holding force for holding the steering wheel 3.

As described above, the key lock cylinder 43 of a steering lock apparatus is provided on part of the outer column 14 which is supported by the vehicle-side bracket 5*a* by way of the column-side bracket 4*a* so as to be able to displace in the forward direction during a secondary collision, in a state protruding from the outer circumferential surface of the outer column 14. This key lock cylinder 43, in the state before the occurrence of a secondary collision, is located further toward the rear than the vehicle-side bracket 5*a* in the forward-backward direction, and is located on the opposite side from the stationary-side support plate section 7 in the width direction. In the construction of this example, this key lock cylinder 43 does not interfere with the connecting section between the stationary-side installation plate section 16 of the vehicle-side bracket 5*a* and the installation plate section 21 of the column side bracket 4*a* which is on the opposite side from the stationary-side support plate section 19*a*.

In the steering column apparatus of this example, constructed as described above, it is possible to increase the support rigidity of the column-side bracket 4*a* with respect to the vehicle side bracket 5*a*. In other words, the vehicle-side bracket 5*a* can firmly fasten the stationary-side installation plate section 16 to the vehicle body, and the stationary-side support plate section 17 is integrated with this stationary-side installation plate section 16, and the rigidity of the connecting section between the stationary-side support plate section 17 and the stationary-side installation plate section 16 becomes sufficiently large by providing a reinforcement rib 44. As described above, the other movable-side support plate section 19*a* of the column-side bracket 4*a* is supported by the stationary-side support plate section 17 that has large rigidity. Moreover, the one movable-side support plate section 19*b* of the column-side bracket 4*a* is also supported by the vehicle-side bracket 5*a* by an installation plate section 21 that is provided on the top end section thereof. Therefore, it becomes possible to increase the support rigidity of the column-side bracket 4*a*. As a result, it is possible to increase the support rigidity of the steering wheel 3 that is supported by the column-side bracket 4*a* by way of the outer column 14 and steering shaft 2*a*, and thus it is possible to improve the operational feeling of the driver.

Moreover, during a secondary collision, first, the outer column 14 moves to the very front adjustable position, then the adjustment rod 35 displaces to the rear-end position of the long hole 32 in the forward-backward direction. From this state, as the outer column 14 moves forward even further, the first connecting member 24 and the second connecting member 25 displace inside the first long hole 22 and second long hole 23. More specifically, the first connecting member 24 displaces to the rear-end side of the first long hole 22, and the second connecting member 25 displace to the front-end side of the second long hole 23 from the state illustrated in FIG. 1 to the state illustrated in FIG. 7. This displacement is performed smoothly due to the existence of the slide plate 26. At the same time, the installation plate section 21 breaks away in the forward direction from the stationary-side installation plate section 16. And this break away also is performed smoothly due to the existence of the slide plate 27.

Due to this break away and displacement described above, the column-side bracket 4a displaces in the forward direction together with the outer column 14. During this displacement, an energy absorbing member (not illustrated in the figure) that is provided between the portion that displaces in the forward direction, which includes the column-side bracket 4a and outer column 14, and the portion that does not displace, which includes the vehicle-side bracket 5a, plastically deforms and absorbs impact energy, making it possible to protect the driver that collided with the steering wheel 3. It is possible to use various known construction of this kind of energy absorbing member. Moreover, even when an independent energy absorbing member is not provided, it is possible to absorb the energy of a secondary collision by applying the construction disclosed in JP2005-280655(A) in the engaging section between the first long hole 22 and the first connecting member 24. In this case, together with forming a wide section having a width dimension that is equal to or greater than the outer diameter of the first connecting member 24 at the front end section of the first long hole 22, the width dimension of the portion of the first long hole 22 that is closer to the rear than this wide section is made to be smaller than the outer diameter of the first connecting member 24. During a secondary collision, this first connecting member 24 causes the other movable-side support plate section 19a to plastically deform, which pushes open the width dimension of the first long hole 22, and the first connecting member 24 displaces to the rear-end side of this first long hole 22. During this process, impact energy is absorbed. In the case where the stationary-side support plate section 17 is a plastically deformable material, similar shock absorbing construction can also be provided in the engaging section between the second long hole 23 and the second connecting member 25.

In the case where either shock absorbing construction is provided, it is possible to simplify the design for sufficiently maintaining the collapse stroke. In other words, there is nothing in front of the key lock cylinder 43, which is provided in a state of protruding toward the side from the side surface of the outer column 14, such as the stationary-side support plate section that will hinder displacement in the forward direction of this key lock cylinder 43. Therefore, it is possible to maintain the collapse stroke regardless of whether there is a key lock cylinder 43. As a result, it is possible to improve the freedom of design for protecting the driver during a secondary collision.

EXPLANATION OF REFERENCE NUMBERS

1 Steering column
2, 2a Steering shaft
3 Steering wheel
4, 4a Column-side bracket
5, 5a Vehicle-side bracket
6 Housing
7 Lower bracket
8 Horizontal shaft
9 Electric motor
10a, 10b Universal joint
11 Intermediate shaft
12 Steering gear unit
13 Tie rod
14 Outer column
15 Inner column
16 Stationary-side installation plate section
17 Stationary-side support plate section
18 Through hole
19a, 19b Movable-side support plate section
20 Connecting plate section
21 Installation plate section
22 First long hole
23 Second long hole
24 First connecting member
25 Second connecting member
26 Slide plate
27 Slide plate
28 Bolt
29 Held wall section
30 Slit
31 Slit in the circumferential direction
32 Long hole in the forward-backward direction
33 Concave groove
34 Long hole in the up-down direction
35 Adjustment rod
36 Adjustment lever
37 Pressing piece
38 Washer
39 Laminated plate
40 Thrust bearing
41 Pressing plate
42 Slit
43 Key lock cylinder
44 Reinforcement rib

What is claimed is:

1. A steering apparatus, comprising:
    a steering column supporting a steering shaft on an inside of the steering column such that the steering shaft can rotate freely;
    a column-side bracket supporting part of the steering column; and
    a vehicle-side bracket supported by and fastened to a vehicle body, and comprising a stationary-side support plate section provided only on one side in a width direction of the column-side bracket;
    a portion of the column-side bracket being supported by the stationary-side support plate section so as to be able to displace forward due to an impact load during a secondary collision, and a portion of the column-side bracket that is on an opposite side in the width direction of the column-side bracket of the steering column from the stationary-side support plate section being supported by the vehicle-side bracket so as to be able to displace forward due to the impact load during the secondary collision;
    wherein
    the column-side bracket comprises a pair of movable-side support plate sections that are located on a left and right, and are each provided with a long hole that is long in an up-down direction;
    a through hole is formed in a top section of the steering column;
    the steering apparatus further comprises: a rod member that spans between the pair of movable-side support plate sections and engages with the long hole in the up-down direction and the through hole of the steering column, an adjustment lever that is connected to one end of the rod member, and an adjustment mechanism that, based on an operation of the adjustment lever, changes a holding force by which the column-side bracket holds the outer column; and the steering column is supported by the vehicle body so as to be able to raise or lower with respect to the column-side bracket;

such that a tilt mechanism wherein whether or not displacement of the steering column in the up-down direction with respect to the column-side bracket is possible is changed based on the operation of the adjustment lever is structured.

2. The steering apparatus according to claim 1, wherein the column-side bracket comprises the pair of movable-side support plate sections located on the left and right, a connecting plate section connecting edges on bottom ends of the pair of movable-side support plate sections, and an installation plate section that is bent outward in the width direction of the steering column from an edge on a top end of one of the pair of movable-side support plate sections; wherein another of the pair of movable-side support plate sections forms the portion of the column-side bracket that is supported by the stationary-side support plate section, and the installation plate section forms the portion of the column-side bracket that is on the opposite side of the steering column from the stationary-side support plate section and that is supported by the vehicle-side bracket.

3. The steering apparatus according to claim 1, wherein the column-side bracket comprises the pair of movable-side support plate sections that are located on the left and right;

the steering column comprises a telescopic steering column that is constructed by fitting together a rear section of an inner column on a front side and a front section of an outer column on a rear side, such that the entire length can expand or contract, and a long hole that is long in a forward-backward direction is provided in a top section of the outer column; and the steering apparatus further comprises: a rod member that spans between the pair of movable-side support plate sections and engages with the long hole in the forward-backward direction, an adjustment lever that is connected to one end of the rod member, and an adjustment mechanism that, based on an operation of the adjustment lever, changes a holding force by which the column-side bracket holds the outer column;

together with the use of a telescopic steering shaft constructed by combining an outer shaft and an inner shaft, and that can transmit torque and expand and contract as the steering shaft;

such that a telescopic mechanism wherein whether or not displacement in the forward-backward direction of the outer column with respect to the column-side bracket is possible is changed based on the operation of the adjustment lever is structured.

4. The steering apparatus according to claim 1, wherein the adjustment mechanism comprises a member having a pair of pressing surfaces that are provided on a base end section and a tip end section of the rod member, and the holding force that the pair of pressing surfaces hold the steering column from both sides in the width direction changes based on a rotation of the rod member according to the operation of the adjustment lever; and of the pair of movable-side support plate sections, a slit is formed in one movable-side support plate section that is on the opposite side from the stationary-side support plate section, and a rigidity in an axial direction of the rod member of a portion on the one movable-side support plate section that is pressed by one of the pressing surfaces is kept low.

5. The steering apparatus according to claim 1, wherein a key lock cylinder of a steering lock apparatus is provided on the steering column in a state protruding from an outer circumferential surface of the steering column in a portion that, before a secondary collision occurs, is in a location that is further toward a rear in a forward-backward direction than the vehicle-side bracket, is on the opposite side in the width direction of the steering column from the stationary-side support plate section, and does not interfere with the portion of the column-side bracket that is on the opposite side from the stationary-side support plate section and that is supported by the vehicle-side bracket.

6. A steering apparatus, comprising:

a steering column supporting a steering shaft on an inside of the steering column such that the steering shaft can rotate freely;

a column-side bracket supporting part of the steering column; and a vehicle-side bracket supported by and fastened to a vehicle body, and comprising a stationary-side support plate section provided only on one side in a width direction of the column-side bracket;

a portion of the column-side bracket being supported by the stationary-side support plate section so as to be able to displace forward due to an impact load during a secondary collision, and a portion of the column-side bracket that is on an opposite side in the width direction of the column-side bracket of the steering column from the stationary-side support plate section being supported by the vehicle-side bracket so as to be able to displace forward due to the impact load during the secondary collision;

wherein the column-side bracket comprises a movable-side support plate section that forms the portion of the column-side bracket that is supported by the stationary-side support plate section, a first long hole that is long in a forward-backward direction is formed in a bottom section of the movable-side support plate section, and a first connecting member is assembled in a bottom section of the stationary-side support plate section;

a second long hole that is long in the forward-backward direction is formed in the bottom section of the stationary-side support plate section in a portion that is further toward a rear than a position where the first connecting member is assembled, and a second connecting member is assembled in a rear-end section of the bottom section of the movable-side support plate section; and with the stationary-side support plate section and the movable-side support plate section placed together, the first connecting member is inserted through the first long hole and connected to the movable-side support plate section, and the second connecting member is inserted through the second long hole and connected to the stationary-side support plate section.

* * * * *